United States Patent
Zhang et al.

(10) Patent No.: US 9,810,311 B1
(45) Date of Patent: Nov. 7, 2017

(54) BAFFLE FOR LUBRICATION MANAGEMENT IN AN AXLE ASSEMBLY

(71) Applicant: Ford Global Technologies, LLC, Dearborn, MI (US)

(72) Inventors: Dengfu Zhang, Northville, MI (US); Michael Carter, Troy, MI (US); Mark Steward, Ann Arbor, MI (US); Marc Thomas Wilkins, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 15/237,824

(22) Filed: Aug. 16, 2016

(51) Int. Cl.
*F16H 57/04* (2010.01)
*F16H 48/06* (2006.01)

(52) U.S. Cl.
CPC ......... *F16H 57/0423* (2013.01); *F16H 48/06* (2013.01); *F16H 57/0483* (2013.01)

(58) Field of Classification Search
None
See application file for complete search history.

(56) References Cited

U.S. PATENT DOCUMENTS

| | | | |
|---|---|---|---|
| 5,505,112 A | 4/1996 | Gee | |
| 6,299,561 B1 | 10/2001 | Kramer et al. | |
| 9,052,009 B2* | 6/2015 | Barillot | F16H 57/0409 |
| 2004/0144597 A1* | 7/2004 | Metelues | F16H 57/0483 184/6.2 |
| 2007/0251348 A1* | 11/2007 | Hayes | F16H 57/0421 74/606 R |
| 2010/0105513 A1* | 4/2010 | Hilker | F16H 48/38 475/160 |
| 2012/0073403 A1* | 3/2012 | Perakes | F16H 57/0483 74/607 |
| 2014/0260790 A1 | 9/2014 | Passino et al. | |

FOREIGN PATENT DOCUMENTS

DE            1047820 B      12/1958

* cited by examiner

*Primary Examiner* — Justin Holmes
(74) *Attorney, Agent, or Firm* — James Dottavio; Brooks Kushman P.C.

(57) ABSTRACT

A vehicle axle includes a housing defining a sump, a gear assembly and a baffle. The gear assembly includes a ring gear disposed within the housing. The ring gear is configured to pump fluid throughout the housing. A pinion gear is meshed with the ring gear. The baffle is disposed within the sump and connected to the housing. The baffle has a first part being configured to control fluid flow across the ring gear and a second part attached to the first part. The second part is configured to control fluid flow across the pinion gear.

11 Claims, 4 Drawing Sheets

BAFFLE FOR LUBRICATION MANAGEMENT IN AN AXLE ASSEMBLY

TECHNICAL FIELD

The present disclosure relates to lubrication management devices for front and rear axles for a vehicle.

BACKGROUND

Vehicle driveline components such as gears, bearings, and other elements require lubrication. Various characteristics of the lubricating fluid, such as viscosity, temperature, and fluid levels may affect durability, drivability, and fuel economy.

SUMMARY

A vehicle axle includes a housing defining a sump, a gear assembly and a baffle. The gear assembly includes a ring gear disposed within the housing. The ring gear is configured to pump fluid throughout the housing. A pinion gear is meshed with the ring gear. The baffle is disposed within the sump and connected to the housing. The baffle has a first part being configured to control fluid flow across the ring gear and a second part attached to the first part. The second part is configured to control fluid flow across the pinion gear.

A vehicle includes a housing surrounding a ring and pinion gear, and defining a sump containing a lubricating fluid and a baffle. The baffle is disposed within the sump such that a first edge of the baffle is above a static fluid level defined by the sump. The baffle has first and second parts to control fluid flow through the housing and across the ring and pinion gears respectively via a hole defined on the first part. The hole is configured to restrict flow of the lubricating fluid across the ring and pinion gears.

An axle assembly for a vehicle includes a housing defining a sump, a gear assembly including ring and pinion gears, and a baffle. The baffle is disposed within the sump has first and second parts being configured to control fluid flow across the ring and pinion gears such that the first part covers the ring gear and the second part covers the pinion gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
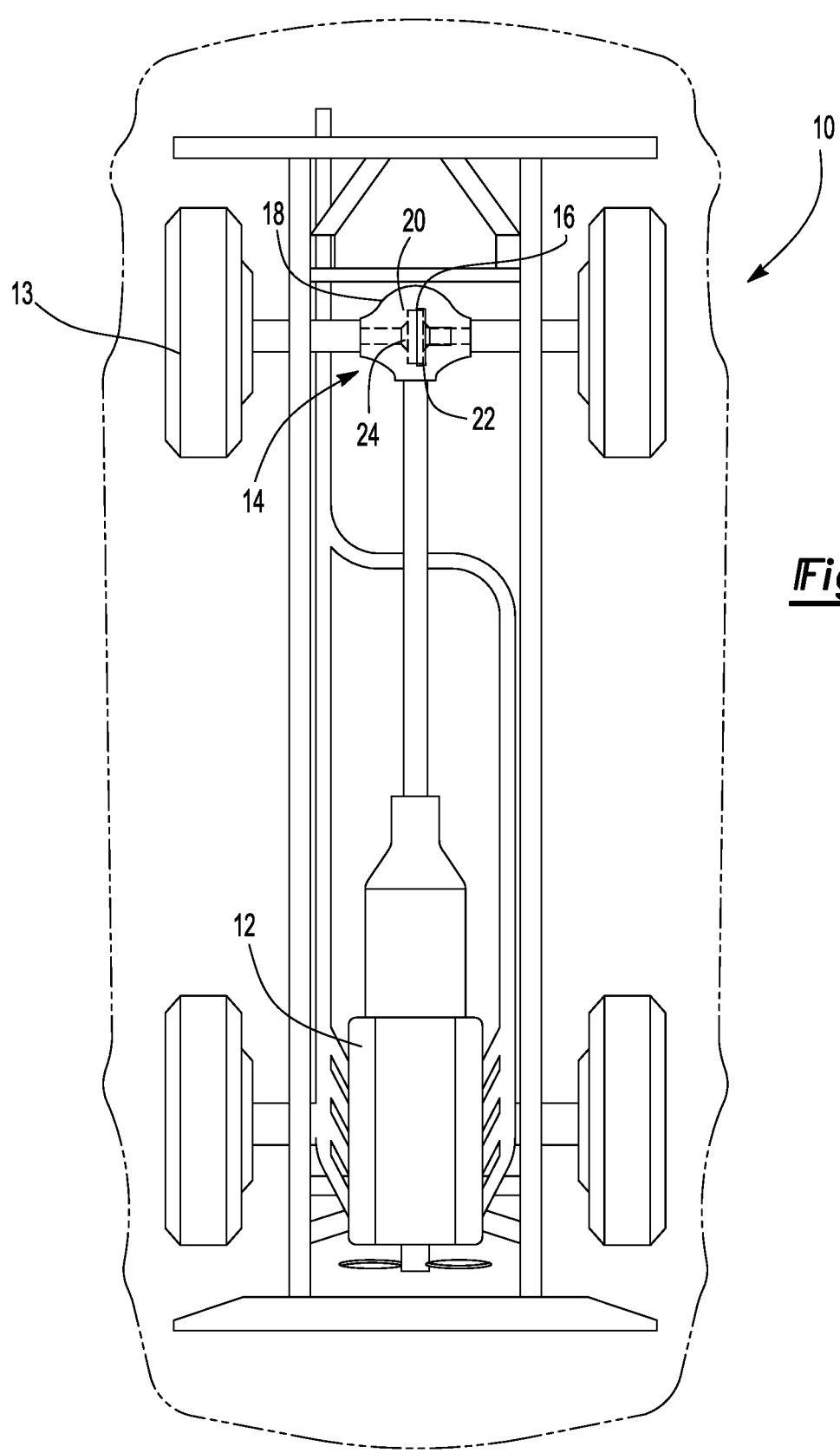
FIG. 1 is a top schematic view of a vehicle having a rear axle assembly.

Referring to FIG. 1, a schematic of a vehicle 10 is shown. The vehicle 10 includes an engine/transmission 12, a differential 14 which includes a ring gear 16 and a housing 18, and a sump 20. The engine/transmission 12 provides torque. The differential 14 transfers torque from the engine/transmission 12 to the vehicle wheels 13. The ring gear 16 of the differential 14 spins allowing torque from the engine/transmission 12 to be transferred to the wheels 13. The ring gear 16, as it spins, pumps lubricating fluid within the differential 14. Pumping the lubricating fluid exerts some torque on ring gear 16 which decreases the torque transmitted to the wheels 13. This is known as a speed related spin loss. Spin loss occurs when vehicle speed is lost due to increased fluid levels within the sump 20.

Management of the fluid levels within the sump 20 may further aid to reduce spin loss of the vehicle 10 as well as significant churn drag loss generated from the strong pumping flow by the ring gear 16. The differential 14 may further include a gear assembly 22, which includes the ring gear 16 as well as a pinion gear 24 coupled to the ring gear 16 to transfer torque from the engine/transmission 12 to the vehicle wheels 13. Reducing the speed related spin loss as well as the churn drag loss further requires management of the fluid levels within the sump 20 such that the ring gear 16 pumps less fluid across the gear assembly 22 including the pinion gear 24 to avoid over flooding at a tail bearing (not shown). Further, optimization of fluid management within the differential 14 provides greater overall efficiency of the vehicle 10 and therefore improves fuel economy of the vehicle 10.

As will be described in more detail below, the differential 14 also includes a baffle 28 disposed within the housing 18 that extends across the gear assembly 22. Specifically, the baffle 28 may be formed as a single unit and cover portions of both the ring gear 16 and the pinion gear 24. The baffle 28 allows for separation between the sump 20 and the ring gear 16, which results in the ring gear 16 pumping less fluid throughout the differential 14. However, fluid within the sump 20 is not completely removed from the gear assembly 22. Rather, the baffle 28 manages fluid flow from the sump 20 across the ring gear 16 to enable a minimal and optimal amount of fluid to be pumped by the ring gear 16. Through managing fluid flow from the sump 20, the baffle 28 reduces the churning drag torque on the ring gear 16 as well as over flooding of the tail bearings. Reducing over flooding of the tail bearings reduces cost of the tail bearings. Further, the baffle 28 does not have a negative impact on normal operations of the differential 14 and requires no additional modification to the housing 18.

Figure 2:
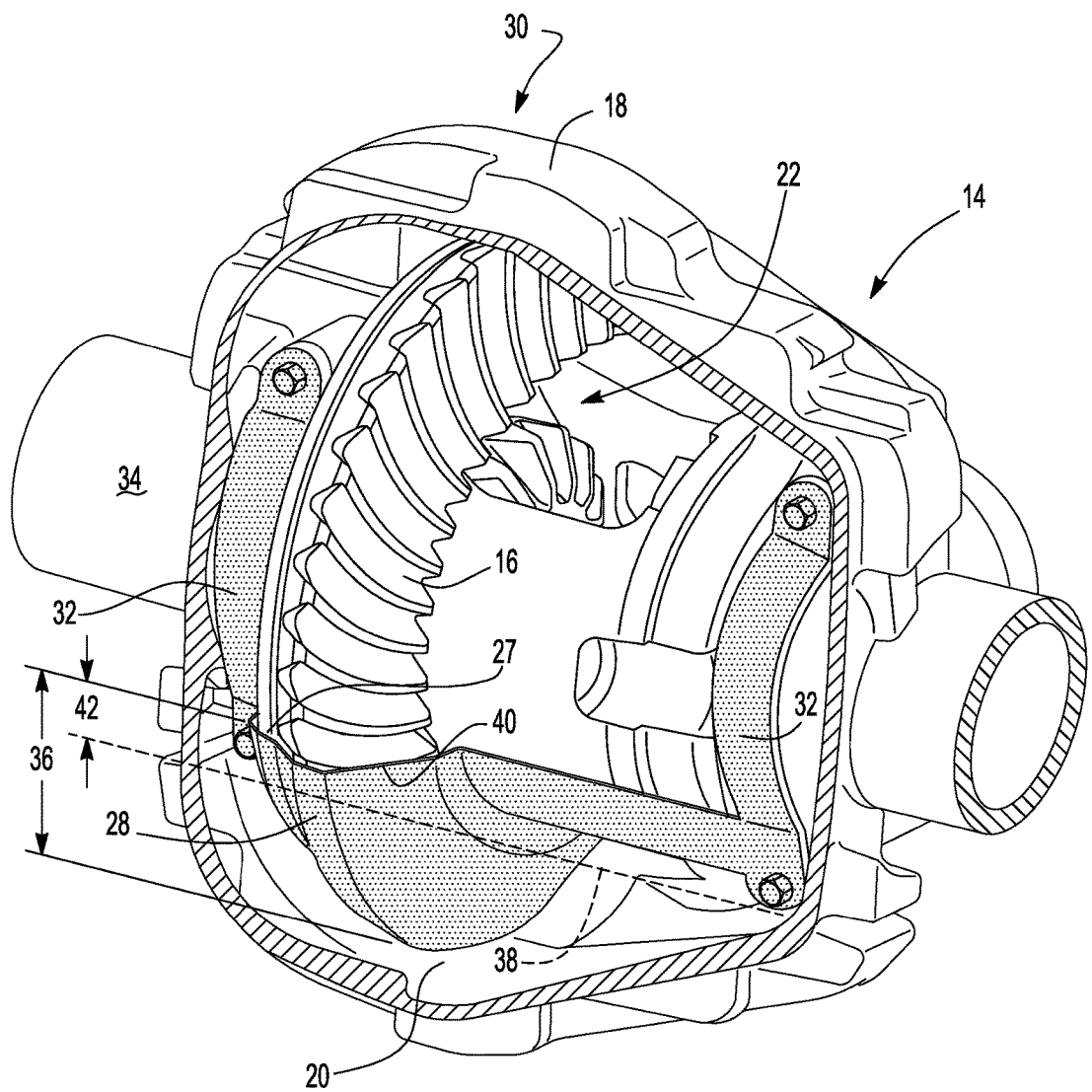
FIG. 2 is a perspective view of the axle assembly showing a baffle within the housing of the axle assembly.

FIG. 2 depicts a perspective view of an axle assembly 30 including the differential 14 showing a cut through the housing 18. FIG. 2 depicts the baffle 28 disposed within the sump 20 and covering a lower portion 27 of the ring gear 16. Further, the baffle 28 attaches to the housing 18 at each end 32 of the housing 18. The ends 32 of the housing 18 receive an axle 34, which transfers torque through the differential 14 to the wheels 13. The baffle 28 attaches inside the housing 18 and is fastened to each end 32. Therefore, the ends 32 remain stationary and hold the baffle 28 from rotating with the differential 14 including the ring gear 16. Holding the baffle 28 stationary allows the baffle 28 to act as a separator between the fluid within the sump 20 and the ring gear 16 to further reduce over pumping by the ring gear 16.

In the embodiment depicted in FIG. 2, the baffle 28 may be configured to manage fluid flow from the sump 20 to the ring gear 16 via a height 36 of the baffle 28. The sump 20 may define a static fluid level 38, which represents an amount of fluid held by the sump 20 when the ring gear 16 is not pumping fluid. For example, the baffle 28 may define a height 36 such that a first edge 40 of the baffle 28 extends beyond the static fluid level 38 of the sump 20. Said differently, the first edge 40 of the baffle 28 may extend to a distance 42 above the static fluid level 38 of the sump 20. Extending the first edge 40 above the static fluid level 38 of the sump 20 separates the sump the 20 from the ring gear 16 via the baffle 28. Therefore, the height 36 of the baffle 28 further aids to manage fluid flow across the ring gear 16.

By extending the first edge 40 above the static fluid level 38 of the sump 20, the height 36 of the baffle 28 manages fluid flow across the ring gear 16 by requiring fluid within the sump 20 flow over the first edge 40 of the baffle 28. Therefore, circulation of the fluid through the differential 14 may be such that the ring gear 16 draws fluid over the first edge 40. Circulating fluid from the sump 20 over the first edge 40 allows the height 36 of the baffle 28 to determine an amount of fluid flowing across the ring gear 16. For example, the height 36 of the baffle 28 may be optimized based on the axial pumping force of the ring gear 16 and an amount of fluid within the sump 20 to provide an optimal and predetermined amount of fluid across the ring gear 16. The height 36 of the baffle 28 may also vary depending on vehicle size. For example, a smaller vehicle, such as a sedan, may use a baffle 28 with a height 36 less than a height 36 of a baffle 28 used for a larger vehicle, such as a truck. Again, fluid is not completely removed from the gear assembly 22.

In the embodiment disclosed in FIG. 2, the first edge 40 of the baffle 28 extends above the static fluid level 38 within the range of 1 to 2 mm. By using a range of 1 to 2 mm, the first edge 40 of the baffle 28 may not require the ring gear 16 to increase operating speed in order to effectively pump the fluid throughout the differential 14. For example, when the first edge 40 of the baffle 28 extends above the static fluid level 38 within the range of 1 to 2 mm, the ring gear 16 may maintain fluid flow from the sump 20 throughout the differential 14 with operating speeds between about 250-750 RPM. Therefore, the height 36 of the baffle 28 allows management of lubrication of the gear assembly 22 without significantly impacting normal operation of the axle assembly 30. Further, the height 36 of the baffle 28 also aids to control over flooding at the tail bearings by controlling the fluid flow across the ring gear 16 as described above.

Figure 3:
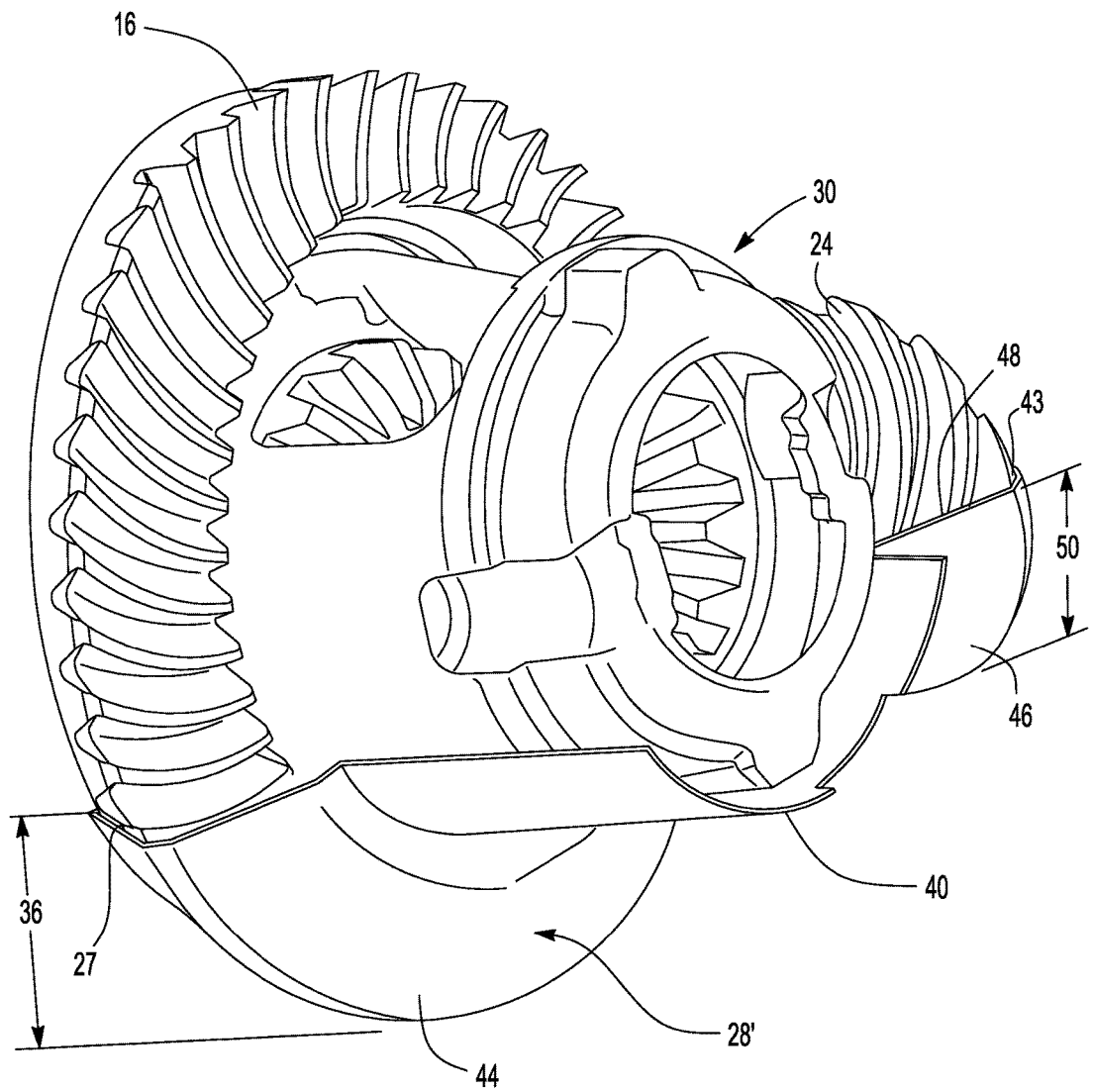
FIG. 3 is a perspective view of the baffle structure around a ring and pinion gear set of the axle assembly.

FIG. 3 depicts a perspective view of a further embodiment of the baffle 28'. The baffle 28' may also be configured to cover a lower portion 43 of the pinion gear 24 as well as the lower portion 27 of the ring gear 16. As depicted in FIG. 3, the baffle 28' may be formed integrally as a single unit, such as through injection molding. In at least one other embodiment, the baffle 28' may be formed as two separate units and joined together either through fastening, welding, adhesive, or any other joining technique. Therefore, the baffle 28' may be formed having a first part 44 and a second part 46. The first part 44 may cover the lower portion 27 of the ring gear 16 and the second part 46 may cover the lower portion 43 of the pinion gear 24.

By using a two part structure, the baffle 28' further controls flow of the lubricating fluid throughout the axle assembly 30. The first part 44, covering the lower portion 27 of the ring gear 16, is configured to direct flow of the lubricating fluid from the sump 20 across the ring gear 16 as described above. The second part 46, covering the lower portion 43 of the pinion gear 24, acts as a barrier to prevent over flooding of the pinion gear 24. The first part 44 and the second part 46 are formed such that meshing between the ring gear 16 and the pinion gear 24 is uninterrupted. For example, the pinion gear 24 meshes with the ring gear 16 and a substantially perpendicular manner. In the same way, the second part 46 is formed with the first part 44 substantially perpendicular to the first part 44. Further, since the baffle 28' is fastened to a nonrotating portion of the housing 18, the second part 46 of the baffle 28' is held against rotation in a similar manner as the first part 44. Again, the first part 44 is held against rotation of the ring gear 16 by joining to stationery ends 32 of the housing 18.

The lower part 46 manages fluid flow across the pinion gear 24 by shielding the lower portion 43 of the pinion gear 24 from excess fluid due to spin loss of the ring gear 16. For example, when the ring gear 16 is pumping fluid throughout the axle assembly 30, the second part 46 separates excess fluid from the pinion gear 24, prevents fluid from circulating across the pinion gear 24 and directs the fluid back into the sump 20. Further, the second part 46 of the baffle 28' aids to direct fluid from the ring gear 16 across the pinion gear 24. Being attached to and extending perpendicularly from the first part 44, the second part 46 directs fluid across the pinion gear 24 based on the amount of fluid sucked into the baffle 28' by the ring gear 16 as detailed above. In a similar manner, the amount of fluid to lubricate the pinion gear 24 may be controlled by the first edge 40 and the height 36 of the baffle 28'. The first edge 40 and the height 36 the baffle 28' control the amount of fluid pumped by the ring gear 16 and therefore controls the amount of fluid circulated across the pinion gear 24.

Alternatively, the second part 46 of the baffle 28' may further include a second edge 48 and define a second height 50. The second edge 48 and the second height 50 may function similarly to the first edge 40 and the height 36 described above. For example, the second part 46 of the baffle 28' may control the amount of fluid circulated across the pinion gear 24 by optimizing the height 50 of the second part 46 as well as the extent that the second edge 48 is above the static fluid level 38. Therefore, the second edge 48 of the second part 46 may result in a height 50 of the second part 46 such that the ring gear 16 may be configured to pump fluid from the sump 20 over the second edge 48 to lubricate the pinion gear 24. Again, the second edge 48 may extend above the static fluid level 38 within the range of 1 to 2 mm. The first edge 40 and height 36 may be defined on the first part 44 in the embodiment shown of the baffle 28' in FIG. 3. In this embodiment, the first edge 40 may be substantially level with the second edge 48 such that the height 36 is equal to the second height 50. In at least one other embodiment, the first edge 40 and the second edge 48 may be non-axial such that the first height 36 is greater than or less than the second height 50 based on the axial pumping force of the ring gear 16 and desired lubrication of the axle assembly 30.

Figure 4:
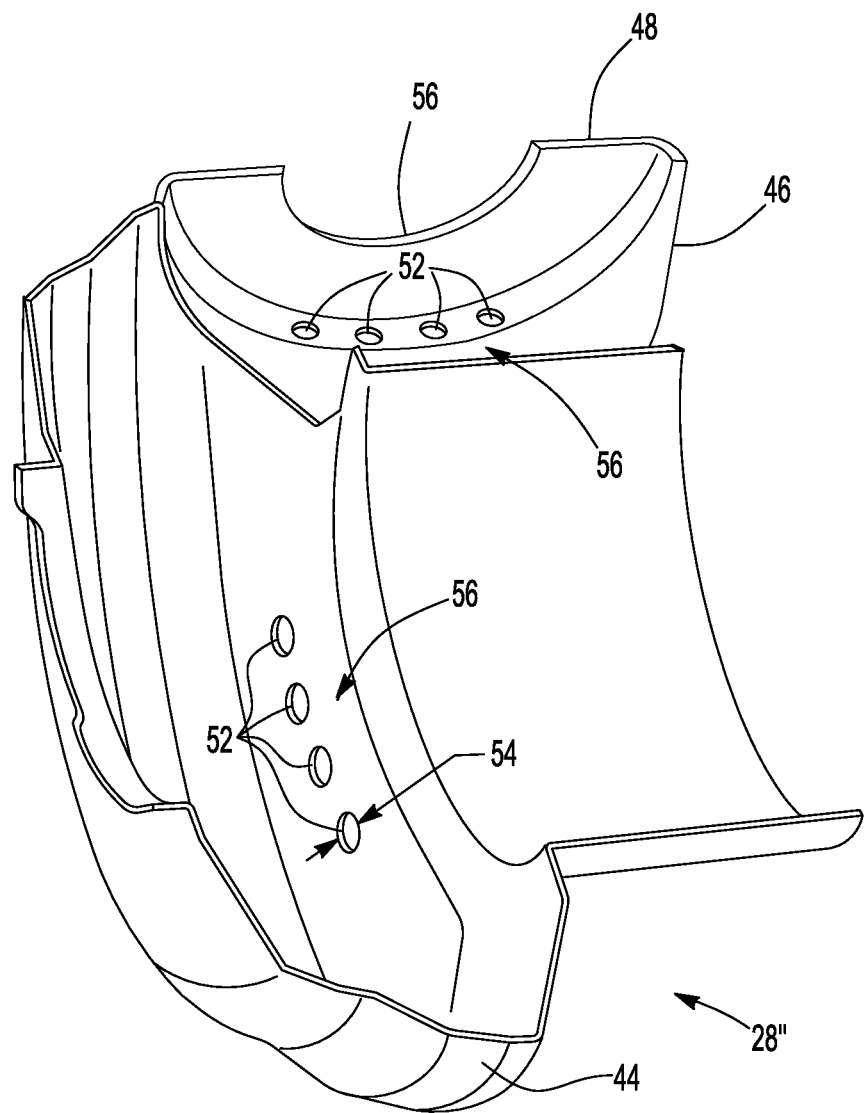
FIG. 4 is a perspective view of a further embodiment of the baffle structure.

Referring to FIG. 4, a third embodiment of the baffle 28" is shown. The baffle 28" may further define a hole 52 on the first part 44 and the second part 46. The hole 52 acts as an inlet to connect the sump 20 and the ring gear 16 through the baffle 28". As the ring gear 16 spins, fluid from the sump 20 is sucked through the hole 52 on either of the first part 44 or the second part 46, and circulated throughout the axle assembly 30 by the ring gear 16. In at least one other embodiment, the hole 52 may be defined only on the first part 44 or the second part 46. In order to ensure fluid flows through the hole 52, the hole 52 may be defined below the static fluid level 38 of the sump 20. Being defined below the static fluid level 38 of the sump 20 allows the hole 52 to act as an inlet to circulate fluid throughout the axle assembly 30. Likewise, the hole 52 may also be defined above the static fluid level 38 of the sump 20. Being defined above the static fluid level 38 of the sump 20 allows the hole 52 to act as an outlet for circulation of the fluid throughout the axle assembly 30.

For example, if the hole 52 is defined solely on the first part 44, the hole 52 controls the amount of lubricating fluid pumped through the axle assembly 30 by the ring gear 16 through suction created by the ring gear 16 into the first part 44. Therefore, the first part 44 via the hole 52, as an inlet, allows fluid from the sump 20 to be pumped by the ring gear 16 throughout the axle assembly 30 and the second part 46 returns fluid to the sump 20 via the second edge 48 as an outlet as well as shields the pinion gear 24 from any excess fluid. Likewise, if the hole 52 is defined solely on the second part 46, the hole 52 controls the amount of lubricating fluid pumped to the axle assembly 30 by the ring gear 16 through suction created by the ring gear 16 into the second part 46. Therefore, the second part 46 via the hole 52, as an inlet, allows fluid from the sump 20 to be pumped by the ring gear 16 throughout the axle assembly 30 and the first part 44 returns fluid to the sump 20 via the first edge 40 as an outlet as well as shields any excess fluid from contacting the ring gear 16. If both the first part 44 and the second part 46 define a hole 52, fluid may circulate throughout the axle assembly 30 pumped by the ring gear 16 in which the hole 52 on either the first part 44 or the second part 46 acts as an inlet and the hole 52 on either the first part 44 the second part 46 acts as an outlet, respectively.

The hole 52 may be sized such that an optimal amount of fluid is sucked into the axle assembly 30 by the ring gear 16 through the baffle 28". For example, the hole 52 may have a diameter 54 sized to allow a respective amount of fluid through the baffle 28" based on the requirements of the vehicle 10. Larger vehicles requiring larger axle assemblies 30 may therefore require a hole 52 heading a larger diameter 54. Similarly, smaller vehicles requiring smaller axle assemblies 30 may therefore require a hole 52 needing a smaller diameter 54. If the hole 52 is defined on the first part 44 and the second part 46 to act as both an inlet and an outlet, each of the holes 52 may define a different diameter 54. For example, the diameter 54 of the hole 52 on the first part 44 may be greater than, less than or equal to the hole 52 on the second part 46 depending on requirements of the vehicle 10 and axle assembly 30. While described as having a diameter indicating that the hole 52 is substantially circular, the hole 52, in at least one other embodiment, may be substantially rectangular, triangular, trapezoidal or any other shape that allows fluid to be sucked into the axle assembly the baffle 28".

The diameter 54 of the hole 52 may also act in conjunction with the first edge 40 or the second edge 48, as described above, in order to ensure an optimal amount of fluid is pumped by the ring gear 16 throughout the axle assembly 30. For example, if the hole 52 defines an inlet, in which the diameter 54 determines fluid flow into the baffle 28", the first edge 40 or the second edge 48 defines an outlet, in which the first height 36 or the second height 50 determines fluid flow out of the baffle 28" depending on the location of the hole 52. The diameter 54 of the hole 52 may be optimized with the first edge 40 or the second edge 48 to ensure an optimal amount of fluid is pumped by the ring gear 16 throughout the axle assembly 30 without over flooding and reducing spin loss of the axle assembly 30. The diameter 54 of the hole 52 may be within the range of about 10 mm to 40 mm.

In at least one other embodiment, the first part 44 and the second part 46 may each define a plurality of holes 56. The plurality of holes 56 may be defined from at least three individual holes 52 to further control flow of lubricating fluid throughout the axle assembly 30. The plurality of holes 56 may manage the amount and flow of the lubricating fluid from the sump 20 and dispersed by the ring gear 16 in a manner substantially similar to the hole 52 detailed above. Again, the plurality of holes 56 may be defined based on vehicle requirements. For example, the first part 44 may include at least three holes 52 within the plurality of holes 56 and the second part 46 may include four holes 52 within the plurality of holes 56, or vice versa. The number of holes 52 defined on either the first part 44 or the second part 46 may be based on size of the vehicle, diameter 54 of the holes 52, or an amount of fluid necessary to optimally lubricate the axle assembly 30. The number of holes 52 on the first part 44 may be greater than, less than or equal to the number of holes 52 defined on the second part 46, or vice versa.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle axle comprising:
   a housing defining a sump;
   a gear assembly including a ring gear disposed within the housing and being configured to pump fluid throughout the housing, and a pinion gear meshed with the ring gear; and
   a baffle disposed within the sump and connected to the housing, having a first part that covers a lower portion of the ring gear being configured to control fluid flow across the ring gear via a plurality of holes defined on the first part and a second part that covers a lower portion of the pinion gear and attached to the first part, the second part being configured to control fluid flow across the pinion gear via a plurality of holes defined on the second part.

2. The vehicle axle of claim 1, wherein the baffle further includes a first edge and is disposed within the sump such that the first edge extends at a distance above a static fluid level defined in the sump.

3. The vehicle axle of claim 1, wherein the plurality of holes defined on each of the first and second parts define a diameter dimensioned such that an amount of fluid directed across the ring gear and the pinion gear is below a threshold.

4. The vehicle axle of claim 3, wherein the diameter of the plurality of holes defined on each of the first and second parts is within a range between 10 to 40 millimeters.

5. A vehicle comprising:
   a housing surrounding a ring and pinion gear, and defining a sump containing a lubricating fluid; and
   a baffle disposed within the sump such that a first edge of the baffle is above a static fluid level defined by the sump, and having a first part that covers a lower portion of the ring gear and a second part that covers a lower portion of the pinion gear to control fluid flow through the housing and across the ring and pinion gears, respectively via a plurality of holes defined on both the first and second parts, wherein the plurality of holes are configured to restrict flow of the lubricating fluid across the ring and pinion gears.

6. The vehicle of claim 5, wherein the first and second parts are integrally formed.

7. The vehicle of claim 5, wherein the baffle defines a height such that the first edge extends at a distance beyond the static fluid level.

8. The vehicle of claim 5, wherein the lubricating fluid is pulled through each of the plurality of holes on both the first and second parts via the ring gear.

9. A vehicle axle assembly comprising:
   a gear assembly including a ring and pinion gear; and
   a baffle disposed within a sump having first and second parts being configured to restrict fluid flow across the ring and pinion gears, respectively via a plurality of holes defined on both of the parts such that the first part covers a lower portion of the ring gear and the second part covers a lower portion of the pinion gear.

10. The vehicle axle assembly of claim 9, wherein the baffle defines a first edge disposed at a distance from a static fluid level defined within the sump.

11. The vehicle axle assembly of claim 9, wherein the first and second parts of the baffle are formed as a single part.

* * * * *